(12) United States Patent  (10) Patent No.: US 9,256,333 B2
Singh et al.  (45) Date of Patent: Feb. 9, 2016

(54) METHOD AND APPARATUS FOR REDUCING NOISE IN CAPACITIVE TOUCH INTERFACES

(71) Applicant: SAMSUNG ELECTRONICS CO., LTD., Suwon-si, Gyeonggi-do (KR)

(72) Inventors: Ramya Bagavath Singh, Karnataka (IN); Sudhir Naik, Karnataka (IN)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 114 days.

(21) Appl. No.: 14/253,302

(22) Filed: Apr. 15, 2014

(65) Prior Publication Data

US 2015/0293621 A1  Oct. 15, 2015

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 2203/04112* (2013.01)

(58) Field of Classification Search
None
See application file for complete search history.

(56) References Cited

U.S. PATENT DOCUMENTS

| | | | | |
|---|---|---|---|---|
| 2008/0142281 A1* | 6/2008 | Geaghan | ................ | G06F 3/044 178/18.06 |
| 2010/0060610 A1* | 3/2010 | Wu | ........................ | G06F 3/044 345/174 |
| 2013/0069884 A1* | 3/2013 | Cheng | .................... | G06F 3/0412 345/173 |
| 2013/0278538 A1* | 10/2013 | Brunet | ..................... | G06F 3/044 345/174 |
| 2013/0321326 A1* | 12/2013 | Kwon | .................... | G06F 3/0416 345/174 |
| 2014/0009216 A1* | 1/2014 | Jo | .......................... | G06F 3/0418 327/517 |
| 2014/0035862 A1* | 2/2014 | Jeong | ..................... | G01R 27/26 345/174 |
| 2014/0062951 A1* | 3/2014 | Chang | ..................... | G06F 3/044 345/174 |
| 2014/0085235 A1* | 3/2014 | Tokita | .................... | G06F 3/0412 345/173 |
| 2014/0176482 A1* | 6/2014 | Wei | ........................ | G06F 3/0418 345/174 |
| 2014/0225858 A1* | 8/2014 | Jo | .......................... | G06F 3/0418 345/174 |
| 2014/0267129 A1* | 9/2014 | Rebeschi | ........... | H03K 17/9622 345/174 |

* cited by examiner

*Primary Examiner* — Seokyun Moon
(74) *Attorney, Agent, or Firm* — Lee & Morse, P.C.

(57) ABSTRACT

A method for controlling a capacitive touch panel includes filtering differential capacitance data. The filtered data is integrated in a first direction of the touch panel to generate a first set of integrated data, and integrated in a second direction of the touch panel to generate a second set of integrated data. The first and second sets of integrated data are averaged, and a touch on the touch panel is detected based on the average of the first and second sets of integrated touch data.

20 Claims, 8 Drawing Sheets

|  | Ref | RX0 | RX1 | RX2 | RX3 | RX4 | RX5 | RX6 | RX7 | RX8 | RX9 | Ref |
|---|---|---|---|---|---|---|---|---|---|---|---|---|
| Single Ended | 0 | a | b | c | d | e | f | g | h | i | j | 0 |
| Differential Data | a-0 | b-a | c-b | d-c | e-d | f-e | g-f | h-g | i-h | j-i | 0-j |  |
| Integrated from Left |  | a | (b-a)+a => b | (c-b)+b => c | ... |  |  |  |  |  |  |  |
| Integrated from Right |  |  |  |  |  |  |  | ... | i-(i-h) => h | j-(j-i) => i | 0-(-j) =>j |  |

| Single-ended data | 0 | 50 | 70 | 10 | 0 |
|---|---|---|---|---|---|
| Differential data | | 50 | 20 | -60 | -10 |
| Noise added | | 2 | 1 | 2 | 2 |
| Differential data + Noise | | 52 | 21 | -58 | -8 |
| Integrated from left | 0 | 52 | 73 | 15 | 7 |
| Integrated from right | -7 | 45 | 66 | 8 | 0 |
| Weighted average | 0 | 50.25 | 69.5 | 9.75 | 0 |

Figure 8

METHOD AND APPARATUS FOR REDUCING NOISE IN CAPACITIVE TOUCH INTERFACES

BACKGROUND

1. Field

One or more embodiments described herein relate to touch sensing systems.

2. Description of the Related Art

A touch screen is a user interface that includes a visual display that detects the presence of a touch on or in the vicinity of a display area. One type of touch screen that has gained popularity uses capacitive sensing to detect touch. However, these and other types of touch screens have proven to have drawbacks, not the least of which includes a degradation of performance caused by noise.

SUMMARY

In accordance with one embodiment, a method of reducing noise in a capacitive touch sensing system includes receiving differential touch data corresponding to values of a plurality of differential sensing nodes of a touch panel; filtering the touch data; performing integration of the filtered touch data with respect to a reference node from a first end and a second end; calculating a weighted average of the integrated touch data measured at the first end and the second end; and detecting a touch on the touch panel based on the calculated weighted average of the integrated touch data.

Filtering the touch data may include performing median filtering of the differential touch data to reduce noise in the touch data. Filtering the touch data may include performing exponential filtering of the median filtered data to reduce noise in the median filtered data.

Integrating the filtered data from the first end may include performing cumulative addition of the filtered touch data from a left side with one reference node at a left end. Integrating the filtered data from the second end may include performing cumulative subtraction of the filtered touch data from a right side with one reference node at a right end.

Obtaining integrated data with minimal noise may include taking an average of the integrated data using one of linear weights or non-linear weights. The weights used for the weighted averaging may vary linearly based on location of one or more sensor electrodes with respect to the first end and the second end.

For data obtained by integration from the left side, nodes on the left side may include high weight values in a descending pattern towards the right nodes. For data obtained by integration from the right side, nodes on the left side may include low weight values in an ascending pattern towards the right nodes.

In accordance with another embodiment, an apparatus for reducing noise in a capacitive touch sensing system includes an input interface to provide differential touch data corresponding to values of a plurality of differential sensing nodes associated with a touch panel; a noise filter to filter the touch data to reduce noise; an integrator module to integrate the filtered touch data with respect to a reference node from a first end and a second end; and a linear weighted averaging filter to calculate a weighted average of the integrated touch data measured at the first end and the second end. The noise filter may include a median filter and an exponential averaging filter.

In accordance with another embodiment, a method for controlling a capacitive touch panel includes filtering differential capacitance data; integrating the filtered data in a first direction of the touch panel to generate a first set of integrated data; integrating the filtered data in a second direction of the touch panel to generate a second set of integrated data; averaging the first and second sets of integrated data; and detecting a touch on the touch panel based on the average of the first and second sets of integrated touch data.

The differential capacitance data may be based on values of a differential sensing node of the touch panel. Filtering the differential capacitance data may include median averaging the differential capacitance data to achieve a first level of noise reduction; and exponential averaging the median-averaged data to achieve a second level of noise reduction, wherein the filtered data to be integrated in each of the first and second directions is based on the exponentially averaged data.

The first direction may be from a left side to a right side of the touch panel, and the second direction may be from the right side to the left side of the touch panel.

Averaging the first and second sets of integrated data may include calculating a weighted average of the first and second sets of integrated data. The weighted average may be calculated based on weight values that change over time. The weight values may change exponentially over time. Averaging the first set of integrated data may be performed based on weight values that increase in the first direction, and averaging the second set of integrated data may be performed based on weight values that decrease in the second direction.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In accordance with one or more embodiments, a method and system are provided for reducing noise in touch interfaces with capacitive sensing mechanism. The noise includes noise that accumulates during integration of capacitance signals measured using the differential capacitive sensing technique. In one embodiment, a two-stage approach is used to suppress the noise. The first stage reduces the display noise effect in differential data before integration by temporal averaging. The second stage suppresses left over noise after integration, by integrating the touch data from both left and right ends and calculating weighted average of the two sets of integrated data.

The noise integration from the left end leads to lower noise levels in the left side of the panel, but higher noise at right side. Similarly integration from right end leads to lower noise in right side of the panel, but higher noise at left side. Hence, an average of these two sets of integrated data with different weights is taken to obtain an integrated data with minimal (or another predetermined level of) noise.

The weights may be chosen such that for the data obtained by integration from left end, the left end nodes will have higher weightage and it goes on decreasing towards the right nodes. Similarly, the data obtained by integration from the right end, the left end nodes will have lower weightage and it goes on increasing towards the right nodes. The obtained integrated capacitance data will have much less noise and can be used for the other touch sensing methods such as segmentation, tracking, co-ordinate extraction, etc.

In accordance with one embodiment, a low-noise integration method includes obtaining a raw data including values for each differential sensing node of a touch panel, filtering the raw data, integrating the filtered data from left and right ends, and calculating the weighted average of the two sets of integrated data. The filtering of raw data may include reducing noise in the raw data by median filtering and reducing noise in the median filtered data by exponential filtering. Integration of the filtered data from left may include cumulative addition of the filtered raw data from left side with one reference node at the left end. Integration of the filtered data from right may include cumulative subtraction of the filtered raw data from right side with one reference node at the right end. The weighted average of the two sets of integrated data comprises averaging using linear weights. The weights used for weighted averaging may vary linearly based on the location of the sensor electrodes with respect to left and right ends.

Figure 1:
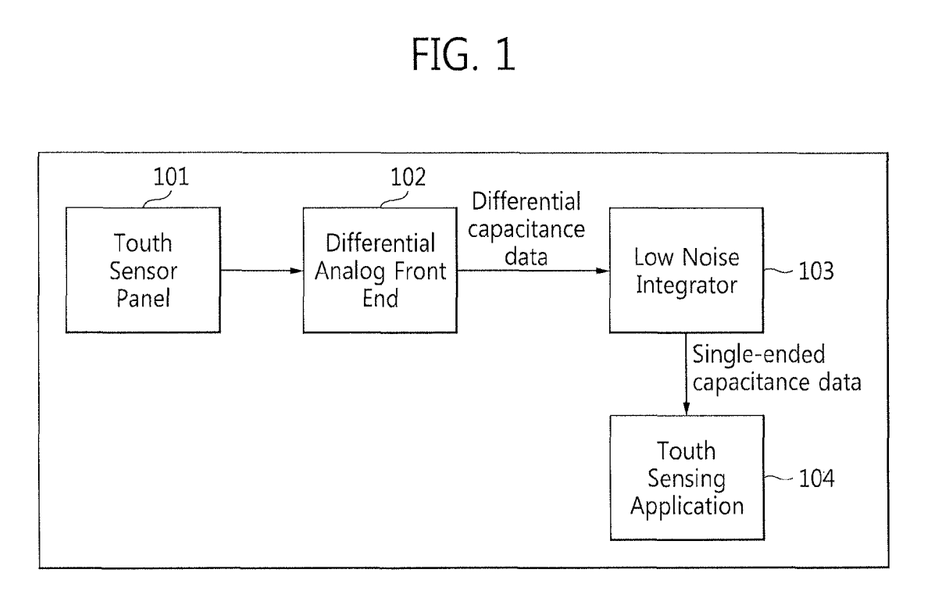
FIG. 1 illustrates an embodiment of capacitive touch sensing apparatus.

FIG. 1 is a block diagram illustrating a high-level representation of one embodiment of a capacitive touch sensing apparatus 100. The apparatus 100 includes a touch sensor panel 101, a differential analog front end 102, a low noise integrator 103, and a touch sensing application 104. The touch sensor panel 101 includes a plurality of transmitter and receiver electrodes which form mutual capacitance or includes a plurality of electrodes which form self capacitance. When the transmitter electrodes are excited with a voltage pulse, charge accumulated at the electrodes are collected at the receiving end and capacitance is measured.

To reduce or nullify noise (e.g., the display noise effect), capacitance data is obtained by measuring the difference between two consecutive receiver electrodes. This is achieved by using Differential Analog Front End (DAFE). In a well-matched panel with ideal DAFE, display noise can be removed completely. However, this may not be possible in all circumstances. The signals from the differential sensing structure should be integrated to obtain signals identical (or at least close) to ones sensed, for example, using a single-ended structure. Integration is achieved by cumulative accumulation of adjacent sensor values by the low noise integrator.

Figure 2:
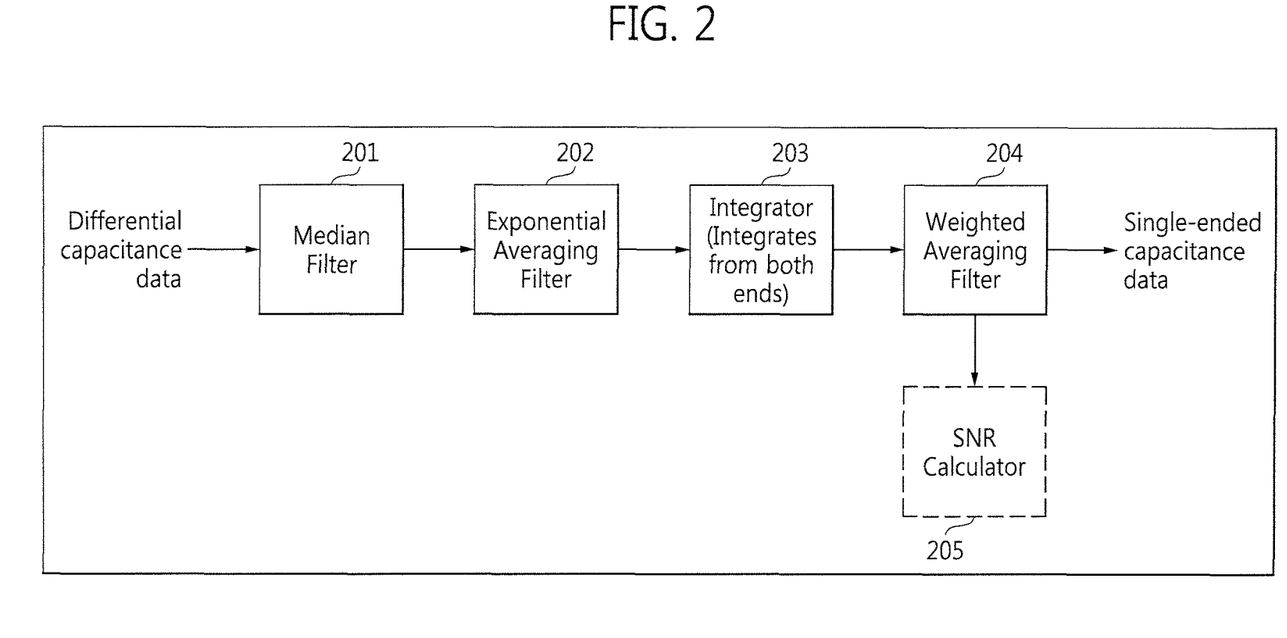
FIG. 2 illustrates an embodiment of a low noise integrator for reducing noise in a touch interface using differential capacitive sensing.

FIG. 2 is a block diagram illustrating an embodiment of a low noise integrator for reducing noise in touch interfaces using differential capacitive sensing. The low noise integrator 103 includes a median averaging filter 201, an exponential averaging filter 202, an integrator module 203, and linear weighted averaging filter 204.

To remove display noise (residual noise), temporal averaging based on a combination of median and exponential averaging is performed. The differential touch data is passed through the median averaging filter 201 and exponential averaging filter 202, which reduces the noise to certain extent. The resultant differential data is passed though the integrator module 203.

The integrator module 203 integrates the differential data from both the sides (left and right ends). Integration of the data from the left end leads to accumulation of noise on the right side, and integration from the right end leads to accumulation of noise on the left side. The integrated data is then passed through linear weighted averaging filter 204.

The linear weighted averaging filter 204 calculates an average of the two sets of integrated data (one from each end). This, in turn, reduces noise effectively. The integrated data can be fed to other touch sensing algorithms. The SNR calculator block 205 may constitute one of the metrics for validation.

Figure 3:
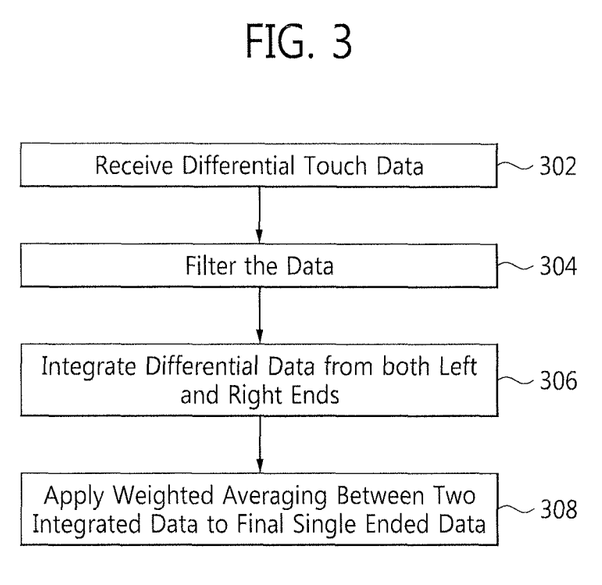
FIG. 3 illustrates an embodiment of a method of reducing noise in a capacitive touch interface.

FIG. 3 is a flow chart illustrating an embodiment of a method of reducing noise in touch interfaces with differential capacitive sensing. Initially, the method includes obtaining differential touch data, in operation 302. The differential touch data may correspond to values of a plurality of differential sensing node associated with the touch panel. The touch data is filtered to remove the noise, in operation 304. Filtering the touch data may include performing median filtering of the differential touch data to reduce the noise in the touch data. Filtering the touch data may further include performing exponential filtering of the median filtered data to reduce noise in the median filtered data. The filtered touch data is integrated with respect to a reference node from a first end and a second end, in operation 306. The weighted average of the integrated touch data measured at the first end and the second end is then calculated, in operation 308.

Figure 4:
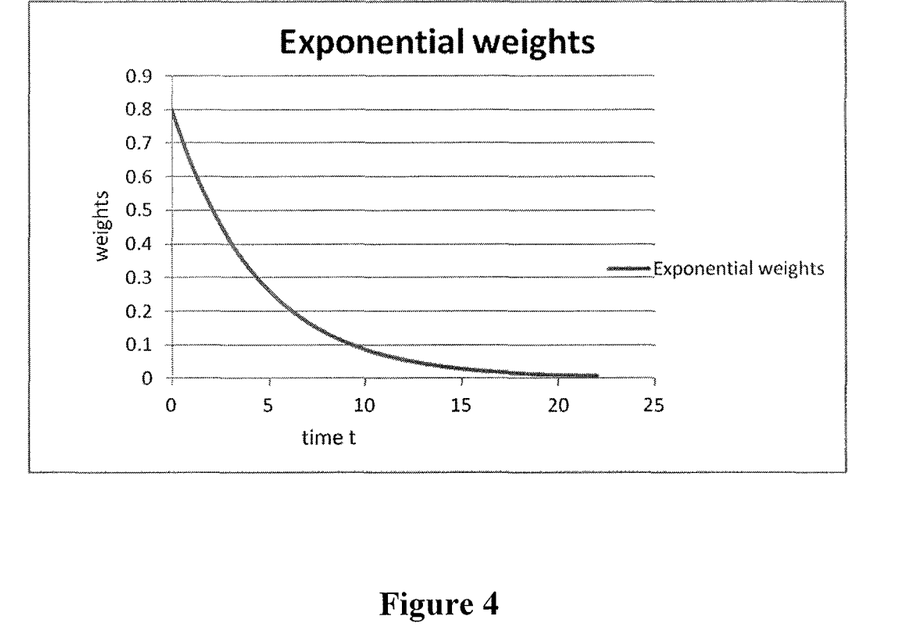
FIG. 4 illustrates an example of exponential weights that may be used in an embodiment of an exponential averaging method.

FIG. 4 illustrates a graphical representation of the exponential weights of exponential averaging method according to one embodiment. As illustrated in FIG. 4, the weights of exponential averaging method are shown. The exponential averaging output is given by: $y(n)=\alpha*x(n)+(1-\alpha)*y(n-1)$. In this equation, $x(n)$ is the input to be exponentially averaged, $y(n)$ is the exponential averaged output data of nth input, and a is the exponential weight factor which should be in a predetermined range, e.g., a range of 0 to 1.

Also, in FIG. 4, the current output depends on one previous output (feedback) and the current input. The graph shows the weightage of present input data on future outputs. The graphical representation also illustrates that the weightage decreases exponentially with respect to time. Effectively, the output is the weighted average of current input and previous inputs, with the weights decaying exponentially with time. In one embodiment, recent inputs may have higher weights compared to older inputs. So, the averaging method may depend on the exponential weight factor α. If α is small, more previous inputs are considered to calculate the output. In this exemplary embodiment, the chosen α is 0.2 which gives good noise reduction in the differential data with the combination of median averaging.

Figure 5:
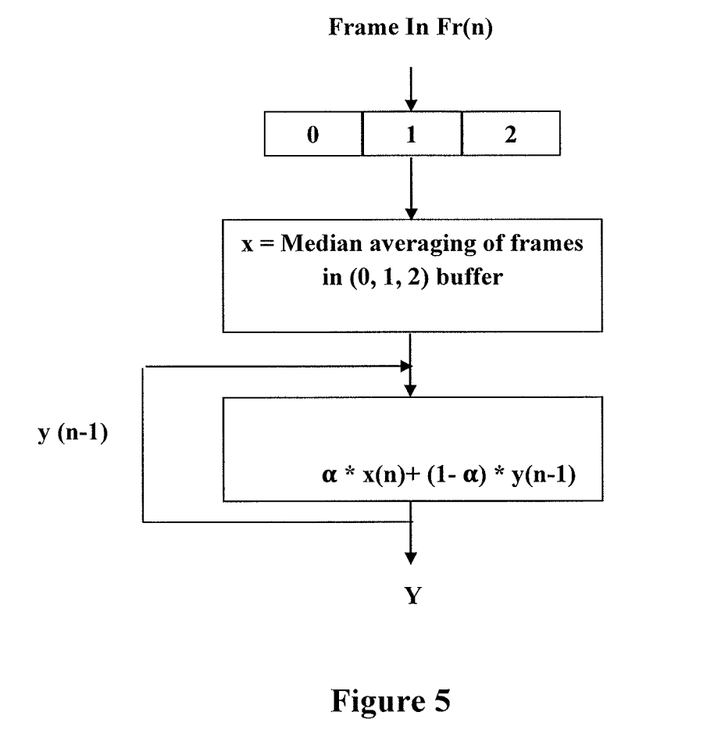
FIG. 5 illustrates an embodiment of a temporal averaging method to remove a display noise effect in differential data.

FIG. 5 illustrates one embodiment of a temporal averaging method to remove the display noise effect in differential data. In this embodiment, the temporal averaging method is the combination of median averaging of m frames followed by exponential averaging. In FIG. 5, Frame Fr(n) is the nth input frame. The block represented as 0,1, and 2 is the buffer of frame size m=3, where m is the number of median averaging inputs. Using these three frames, the median of each node value is obtained and the output is stored as x. Then, the exponentially averaged output y(n) at time t is obtained by $y(n)=\alpha*x(n)+(1-\alpha)*y(n-1)$. This requires one previous output which is y(n−1). For the first frame Fr(n), at n=0, the whole operation waits for 2 future frames to be filled in the buffer, and the exponential averaged output is same as the median averaged output because of no previous exponential averaged output.

Figure 6:
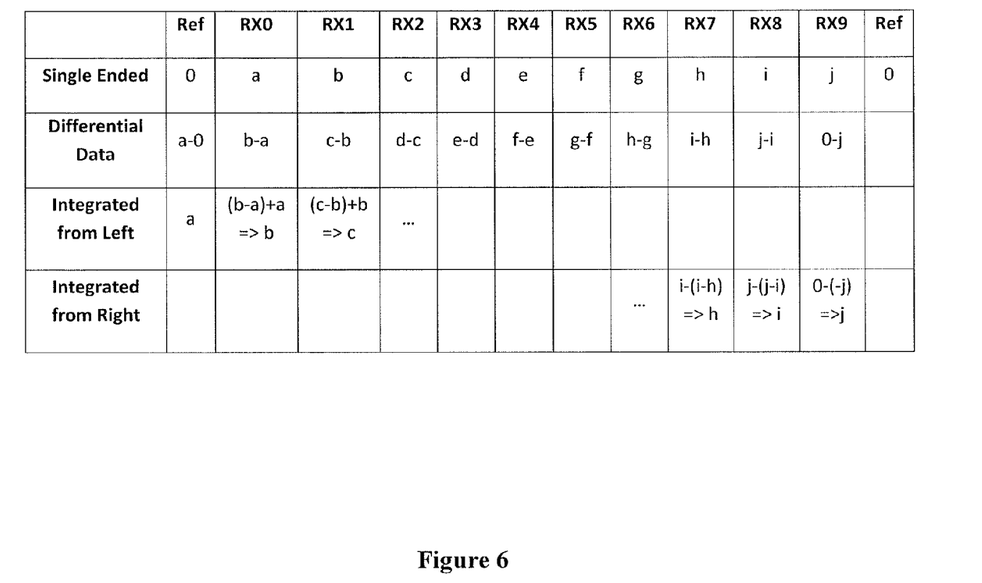
FIG. 6 illustrates an example of a tabular representation of the integration of differential touch data.

FIG. 6 illustrates a tabular representation of the integration of differential touch data from the left end and right end according to one embodiment. A reference node is used at respective left and right ends, which are indicated in the Ref column in the table.

The first row, named Single Ended, includes single-ended capacitance values (a to j) from RX0 to RX9 and reference value as zeros at both of the ends.

The second row, named Differential Data, is obtained by RX (n+1)−RX (n), keeping the first single ended value 'a' as reference at the left and T at the right.

The third row, named Integrated from Left, starts integration with the reference value at the left end, which is additive accumulation. For example, column RX0 value is obtained by the current node differential value 'b−a,' the previous node integrated single ended value 'a' which is ((b−a)+a), and so on.

The fourth row integrated from the right end includes the integrated data, where integration starts from the right end. Here, consecutive values are to be subtracted from the previous value(s). From the table, it is clearly visible that there is no noise in the differential data, and the integration gives exact same results as the original single-ended value in the first row. If the noise at different nodes has both positive and negative values, then some of the noise gets cancelled out (noise of opposite signs) during integration due to cumulative addition.

According to one embodiment, the worst case noise with respect to integration is the one where the sign of the noise (either, all positive or all negative values) at each node is same. In this scenario, the noise accumulation during integration goes on increasing from the starting node until the final node. If we start with integration from the left end, high noise may occur in the right edges of the touch panel, and vice-versa. To overcome this effect, integration is performed from both the ends (from both left and right ends). Then, weighted averaging of the two integrated outputs is performed to obtain a final integrated output.

Figure 7:
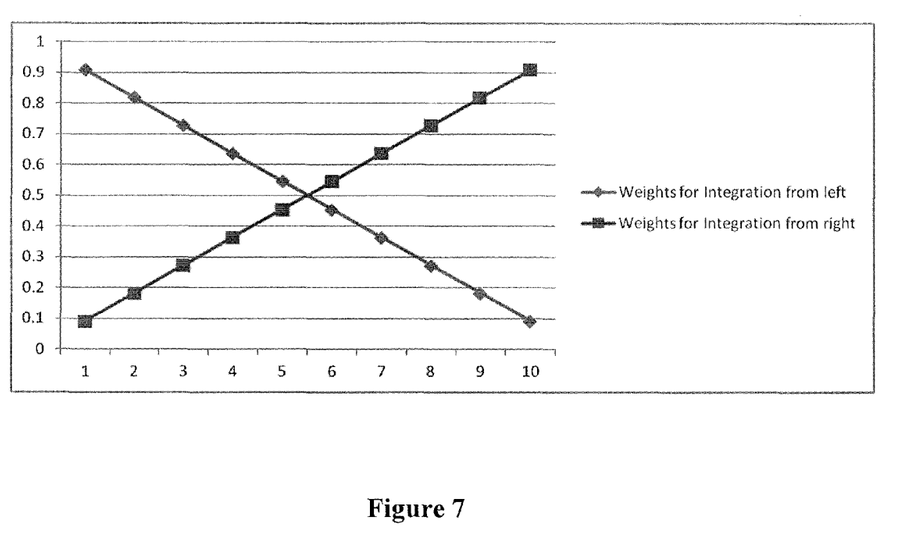
FIG. 7 illustrates an example of linear weights which may be used for integration in accordance with one embodiment.

FIG. 7 is a graphical representation of one embodiment of linear weights that may be used for integration from both the left and right ends. In FIG. 7, the weighted averaging operation is performed for integration from both (left and right) ends, which will further reduce the noise. Integration from left end leads to lower noise levels in left side of the panel, but higher noise at right side. Similarly, integration from the right end leads to lower noise in right side of the panel, but higher noise at left side. So an average of these two sets of integrated data with different weights is taken to obtain integrated data with minimal noise.

In the plot in FIG. 7, the weights are explained for 10 nodes. The line from top left to bottom right shows the weights of each node in the integration from the left end. Here, it is clear that left-most node (first) has the highest weight (less noise) and right end node (last 10th node) has the lowest weight (high noise). Similarly, the other line (bottom left to top right) represents the weights for integration from the right end.

The weights are chosen such that, for the data obtained by integration from the left end, left nodes will have higher weightage. The weightage decreases towards the right nodes. For the data obtained by integration from the right end, left nodes will have lower weightage. The weightage then increases towards the right nodes. The integration from both the ends and the linear weighted averaging method reduces or eliminates the noise to a predetermined (e.g., maximum) extent. The rest of the touch sensing algorithms will have almost noise-free single-ended data to process.

Figure 8:
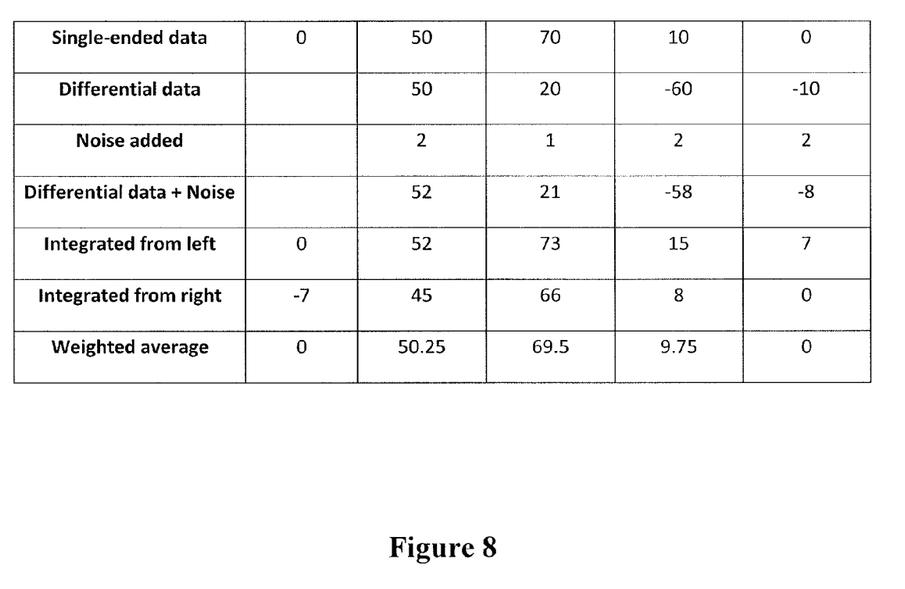
FIG. 8 illustrates an example of differential touch data in accordance with one embodiment.

FIG. 8 is a table illustrating examples of differential touch data measured from both left and right ends. The table gives the example of adding random noise and integration of differential data from left and right ends, and its weighted averaging results. The integrated data is closer to the single-ended data value, which can give high signal-to-noise ratio.

By way of summation and review, in a capacitive touch screen, capacitive sensors measure the electrical property of capacitance. Capacitance is a property measured based on the separation distance of two conductive surfaces that have an intervening dielectric and that store electric charge. A change in the distance, dielectric, or area of overlap between the conductive surfaces changes the capacitance. Capacitive sensors detect changes in position of a target or a user input based on this change of capacitance.

Additionally, capacitive touch sensing is performed either measuring the change in self-capacitance or mutual capacitance. Measuring a change in mutual capacitance allows for the detection of multi-touch events. Hence, recent capacitive touch panels use mutual capacitance for touch sensing.

One approach for reducing panel thickness involves placing the touch sensors very close to the driving lines of the display. This approach is referred to as on-cell capacitive sensing. In one-cell capacitive touch panels, noise is generated in touch signals that degrade performance. This noise may be caused by various effects, not the least of which includes cross-coupling between display lines and touch sensors.

One approach for attempting to reduce this noise involves using differential sensing between adjacent sensor channels. The signals from a differential sensing structure is then integrated to obtain signals identical to the ones sensed using the conventional capacitance touch sensors. Integration may be performed based on the accumulation of adjacent sensor values. This approach, however, has proven ineffective because significant noise in the differentially sensed signals is still present. This is because, for example, the panel is not well matched, as different sensor electrodes may have different parasitic capacitance due to manufacturing process limitations. Also the Analog Front End (AFE) is also not ideal. As a result, residual noise accumulates during the integration process, which thereby reduces signal-to-noise Ratio (SNR) and, in turn, causes poor touch interface.

In accordance with one or more of the aforementioned embodiments, a method and apparatus is provided for reducing noise in a touch panel. In accordance one these or other embodiments, a method and apparatus is provided for reducing the accumulation of noise during the integration of signals.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of reducing noise in a capacitive touch sensing system, the method comprising:
   receiving differential touch data corresponding to values of a plurality of differential sensing nodes of a touch panel;
   filtering the touch data;
   performing integration of the filtered touch data with respect to a reference node from a first end and a second end;
   calculating a weighted average of the integrated touch data measured at the first end and the second end; and
   detecting a touch on the touch panel based on the calculated weighted average of the integrated touch data.

2. The method as claimed in claim 1, wherein filtering the touch data comprises performing median filtering of the differential touch data to reduce noise in the touch data.

3. The method as claimed in claim 2, wherein filtering the touch data further comprises performing exponential filtering of the median filtered data to reduce noise in the median filtered data.

4. The method as claimed in claim 1, wherein integrating the filtered data from the first end comprises performing cumulative addition of the filtered touch data from a left side with one reference node at a left end.

5. The method as claimed in claim 4, wherein integrating the filtered data from the second end comprises performing cumulative subtraction of the filtered touch data from a right side with one reference node at a right end.

6. The method as claimed in claim 5, further comprising:
   obtaining integrated data with minimal noise by taking an average of the integrated data using one of linear weights or non-linear weights.

7. The method as claimed in claim 6, wherein the weights used for the weighted averaging varies linearly based on location of one or more sensor electrodes with respect to the first end and the second end.

8. The method as claimed in claim 6, wherein, for data obtained by integration from the left side, nodes on the left side include high weight values in a descending pattern towards the right nodes.

9. The method as claimed in claim 6, wherein, for data obtained by integration from the right side, nodes on the left side include low weight values in an ascending pattern towards the right nodes.

10. An apparatus for reducing noise in a capacitive touch sensing system, the apparatus comprising:
    an input interface to provide differential touch data corresponding to values of a plurality of differential sensing nodes associated with a touch panel;
    a noise filter to filter the touch data to reduce noise;
    an integrator module to integrate the filtered touch data with respect to a reference node from a first end and a second end; and
    a linear weighted averaging filter to calculate a weighted average of the integrated touch data measured at the first end and the second end.

11. The apparatus as claimed in claim 10, wherein the noise filter includes a median filter and an exponential averaging filter.

12. A method for controlling a capacitive touch panel, comprising:
    filtering differential capacitance data;
    integrating the filtered data in a first direction of the touch panel to generate a first set of integrated data;
    integrating the filtered data in a second direction of the touch panel to generate a second set of integrated data;
    averaging the first and second sets of integrated data; and
    detecting a touch on the touch panel based on the average of the first and second sets of integrated touch data.

13. The method as claimed in claim 12, wherein the differential capacitance data is based on values of a differential sensing node of the touch panel.

14. The method as claimed in claim 12, wherein filtering the differential capacitance data includes:
    median averaging the differential capacitance data to achieve a first level of noise reduction; and
    exponential averaging the median-averaged data to achieve a second level of noise reduction, wherein the filtered data to be integrated in each of the first and second directions is based on the exponentially averaged data.

15. The method as claimed in claim 12, wherein the first direction is from a left side to a right side of the touch panel.

16. The method as claimed in claim 15, wherein the second direction is from the right side to the left side of the touch panel.

17. The method as claimed in claim 12, wherein averaging the first and second sets of integrated data includes calculating a weighted average of the first and second sets of integrated data.

18. The method as claimed in claim 12, wherein the weighted average is calculated based on weight values that change over time.

19. The method as claimed in claim 18, wherein the weight values change exponentially over time.

20. The method as claimed in claim 12, wherein:
    averaging the first set of integrated data is performed based on weight values that increase in the first direction; and
    averaging the second set of integrated data is performed based on weight values that decrease in the second direction.

* * * * *